(12) United States Patent
Villaret et al.

(10) Patent No.: US 7,295,992 B2
(45) Date of Patent: Nov. 13, 2007

(54) METHOD AND SYSTEM FOR DELIVERING PRODUCTS AND SERVICES TO A POINT OF SALE LOCATION

(75) Inventors: Jean-Marc Villaret, Paris (FR); William Stuart Taylor, Cupertino, CA (US); Kevin Frank Ritschel, San Jose, CA (US); Nicholas Clark Epperson, San Ramon, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 09/849,925

(22) Filed: May 4, 2001

(65) Prior Publication Data

US 2002/0026367 A1 Feb. 28, 2002

Related U.S. Application Data

(60) Provisional application No. 60/229,244, filed on Aug. 30, 2000.

(51) Int. Cl.
*G06Q 20/00* (2006.01)

(52) U.S. Cl. .............................. 705/16; 705/14; 705/26; 705/38; 235/280; 235/282; 235/283; 235/300

(58) Field of Classification Search .................. 705/16, 705/18, 20, 21, 22, 24, 26, 27, 64, 14, 39; 235/383, 382, 380, 280, 282, 283
See application file for complete search history.

(56) References Cited

U.S. PATENT DOCUMENTS 6,000,608 A * 12/1999 Dorf ........................... 235/380
6,010,067 A * 1/2000 Elbaum ....................... 235/380
6,145,739 A * 11/2000 Bertina et al. ............... 235/380
6,264,104 B1 * 7/2001 Jenkins et al. ............... 235/383
6,304,915 B1 * 10/2001 Nguyen et al. .............. 709/250
6,353,772 B1 * 3/2002 Silverbrook ................. 700/233
6,412,654 B1 * 7/2002 Cleeve .......................... 221/7
6,543,684 B1 * 4/2003 White et al. ................. 235/379
6,675,153 B1 * 1/2004 Cook et al. .................... 705/74
2001/0037245 A1 * 11/2001 Ranganath et al. ........... 705/16
2002/0169626 A1 * 11/2002 Walker et al. .................. 705/1

* cited by examiner

*Primary Examiner*—Ryan Zeender
*Assistant Examiner*—Asfand M. Sheikh

(57) ABSTRACT

A method and a system for using an electronic funds transaction point of sale (EFTPOS) payment system to provide products and services to a point of sale location without compromising the security of payment processing by the EFTPOS payment system. In one example embodiment, the EFTPOS terminal arrangement is coupled to a first vendor data processing system (DPS) hosting a first application and is coupled to a financial institution DPS hosting a second application, wherein the terminal arrangement hosts one or more payment applications and one or more non-payment applications. The method includes accessing the first application at the first vendor DPS via the non-payment application of the EFTPOS terminal arrangement and selecting a product via the non-payment application and offered by the first application on the first vendor DPS. A set of customer-specific financial account data is transmitted from the payment application of the EFTPOS to the second application on the financial institution DPS for processing payment for the product. A transaction confirmation is then received via the EFTPOS terminal arrangement from the second application on the financial institution DPS in response to the financial account data transmission at the second application.

12 Claims, 6 Drawing Sheets

FIG.2

Provide products/services via EFTPOS Systems — 200

| | |
|---|---|
| Provide data sets from a non-financial DPS via the EFTPOS terminal | 202 |
| ↓ | |
| Access first application of first vendor DPS via non-payment application of terminal | 204 |
| ↓ | |
| Select product from vendor application using terminal | 206 |
| ↓ | |
| Determine a payment amount for selected product | 208 |
| ↓ | |
| Transmit customer-specific financial account data set to second application financial institution DPS for processing of payment | 210 |
| ↓ | |
| Receive via terminal a transaction confirmation in response to financial account data transmission | 212 |
| ↓ | |
| Generate a data set in response to product selection (optional) | 214 |
| ↓ | |
| Transmit the data set from the terminal to a second vendor DPS via a communications network in response to transaction confirmation (optional) | 216 |

FIG. 4

Transmitting data from an External DPS to an EFTPOS terminal of an EFTPOS System — 400

- assign an EFTPOS address to an EFTPOS terminal via non-payment application of EFTPOS arrangement — 402
- Receive from the eternal DPS a first data set with an address identifier used to direct the first data set to the EFTPOS terminal — 404
- Encode the address identifier to include a DPS address identifier for the external DPS (optional) — 406
- Convert the address identifier to the EFTPOS address assigned to the EFTPOS terminal via non-payment application of EFTPOS arrangement — 408
- Transmit the first data set to the EFTPOS terminal using the assigned EFTPOS address — 410
- Transmit a second data set from the EFTPOS terminal to the external DPS in response to receipt of the first data set (optional) — 412
- Convert the EFTPOS address to the address identifier and transmit data set to external DPS (optional) — 414

METHOD AND SYSTEM FOR DELIVERING PRODUCTS AND SERVICES TO A POINT OF SALE LOCATION

RELATED PATENT DOCUMENTS

This application claims priority to U.S. Provisional Application Ser. No. 60/229,244, filed on Aug. 30, 2000 (10005203-1), entitled "Internet Services Delivered to the EFTPOS."

FIELD OF THE INVENTION

The present invention generally relates to Electronic Funds Transaction Point of Sale (EFTPOS) systems, and more particularly to conducting non-payment transactions over a communications network using an EFTPOS terminal.

BACKGROUND OF THE INVENTION

Electronic Funds Transaction Point of Sale (EFTPOS) terminals and systems have operated for many years. Most current EFTPOS terminals function in the same manner in that account data are input to the terminal, usually via a magnetic stripe reading device. A display and keypad are usually integrated with the EFTPOS terminal. The consumer is prompted to enter a personal identification number (PIN) associated with a debit card before the account data are sent to a bank or financial institution for payment authorization. Once authorization is received the transaction continues until completion, for example, by receipt of article purchased and receiving the receipt.

EFTPOS systems are highly secure systems that are designed to run a limited number of applications using a dial out modem. The modem is linked to servers that are controlled by financial institutions. Only authorized bank personnel are authorized to install or upgrade software applications residing in the EFTPOS terminals. PIN numbers are not stored in the terminals, and tampering with any EFTPOS terminal is automatically detected and payment transactions through the tampered line are immediately suspended.

EFTPOS terminals are usually located adjacent the cash register in merchant locations for conveniently processing payments. Once the data are input to the terminal, the data are sent via a transaction-switching network to the customer-bank's host computer to obtain bank authorization. The merchant's bank coordinates the settlement of funds from the customer's bank to the merchant's bank.

In an effort to compete more effectively with on-line vendors, brick-and-mortar merchants have started to offer the convenience of Internet shopping sites and of product exchanges/returns at their physical store locations of on-line purchases. This strategy may work to maintain the current customer base, nevertheless, merchants need in-store customer traffic to grow in order to compensate for increasing operating costs of maintaining the physical store locations.

Consumers that shop frequently on-line or pay their bills on-line try to balance convenience with risk since these transactions have relatively poor security safeguards. Despite the efforts of on-line vendors to improve the security of purchase transactions, the fact that the transactions are being conducted over a public network, such as the Internet, makes it extremely difficult to prevent others from capturing sensitive information as it is being transmitted over the public network. EFTPOS systems, on the other hand, provide a high level of security in processing payments due to controlled communications lines and complex protocols required by financial institutions. However, these transactions are limited to authorization of payments and electronic funds transfers that are not conducted over the Internet or any other public network. Any attempts to make EFTPOS systems more flexible have been deterred due to the number of different protocols that exist (since each financial institution has its own protocol and guidelines) and the requirement of controlling communications to maintain high levels of security. Personal computers do offer the convenience of entering your credit card number for on-line purchases. However, payment security is compromised as a consequence of such convenience.

A method and a system that address the aforementioned problems, as well as other related problems, are therefore desirable.

SUMMARY OF THE INVENTION

The present invention is directed to addressing the above and other needs in connection with using EFTPOS payment systems to provide products and services to a point of sale location without compromising the security of the EFTPOS payment system. EFTPOS payment systems can now service stored value chipcard-based programs via special applications that run in the EFTPOS system or in a remote EFTPOS server. Throughout this specification and in the claims, the term "product(s)" is used in reference to both products and services. In addition, the term "merchant" is used in this specification as the party that manages the EFTPOS system or that has the EFTPOS terminal; the term "vendor" is the non-merchant party that offers products to the merchant or the merchant's customer via the EFTPOS system/terminal.

According to one aspect of the invention, a computer-implemented method of providing products is facilitated via an electronic funds transaction point of sale (EFTPOS) terminal arrangement. The EFTPOS terminal arrangement is coupled to a first vendor data processing system (DPS) hosting a first application and is coupled to a financial institution DPS hosting a second application, wherein the terminal arrangement hosts one or more payment applications and one or more non-payment applications. The method includes accessing the first application at the first vendor DPS via the non-payment application of the EFTPOS terminal arrangement and selecting a product via the non-payment application and offered by the first application on the first vendor DPS. A set of customer-specific financial account data is transmitted from the payment application of the EFTPOS to the second application on the financial institution DPS for processing payment for the product. A transaction confirmation is then received via the EFTPOS terminal arrangement from the second application on the financial institution DPS in response to receipt of the financial account data transmission at the second application.

According to another aspect of the invention, a computer implemented method of processing a stored value data set corresponding to a vendor is facilitated using an electronic funds transaction point of sale (EFTPOS) terminal arrangement. The storedvalue data are quantifiable units having a redeemable value that are adapted to be stored in a storage device. The method includes accessing a first database that has the stored-value data sets available for purchase via the EFTPOS terminal arrangement. A stored-value data set is generated in response to a data selection from the first database. The stored-value data set is received in a storage device configured to download the stored value data set from the first database via the EFTPOS terminal arrangement.

According to another aspect of the invention, a computer-implemented method of providing products is facilitated via an electronic funds transaction point of sale (EFTPOS) terminal arrangement. The EFTPOS terminal arrangement is coupled to a first vendor data processing system (DPS) hosting a first application and is coupled to a financial institution DPS hosting a second application, wherein the terminal arrangement hosts one or more payment applications and one or more non-payment applications. The method includes accessing the first application at the vendor DPS via the non-payment application of the EFTPOS terminal arrangement and selecting a product via the non-payment application and offered by the first application database on the vendor DPS. A transaction confirmation is received via the EFTPOS terminal arrangement from the first application on the vendor DPS in response to selection of the product.

According to yet another aspect of the invention, a computer-implemented method of providing products and services at a point of sale location is facilitated via an electronic appliance. The appliance hosts one or more non-payment applications and is coupled to a first vendor data processing system (DPS) hosting a first application. The method includes displaying a data set on the electronic appliance received from the first application of the first vendor DPS. The first application at the first vendor DPS is accessed via the non-payment application of the electronic appliance in response to the receipt of the displayed data set. A product is then selected via the non-payment application and offered by the first application on the first vendor DPS. The electronic appliance then receives a transaction confirmation from the first application at the first vendor DPS in response to selecting the product.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings in which:

FIG. 2 is a flowchart illustrating the manner of providing products and services via an EFTPOS system in accordance with an example embodiment of the invention;

FIG. 4 is a flowchart illustrating the manner of transmitting non-financial data to an EFTPOS terminal of an EFTPOS system in accordance with an example embodiment of the invention;

Figure 1:
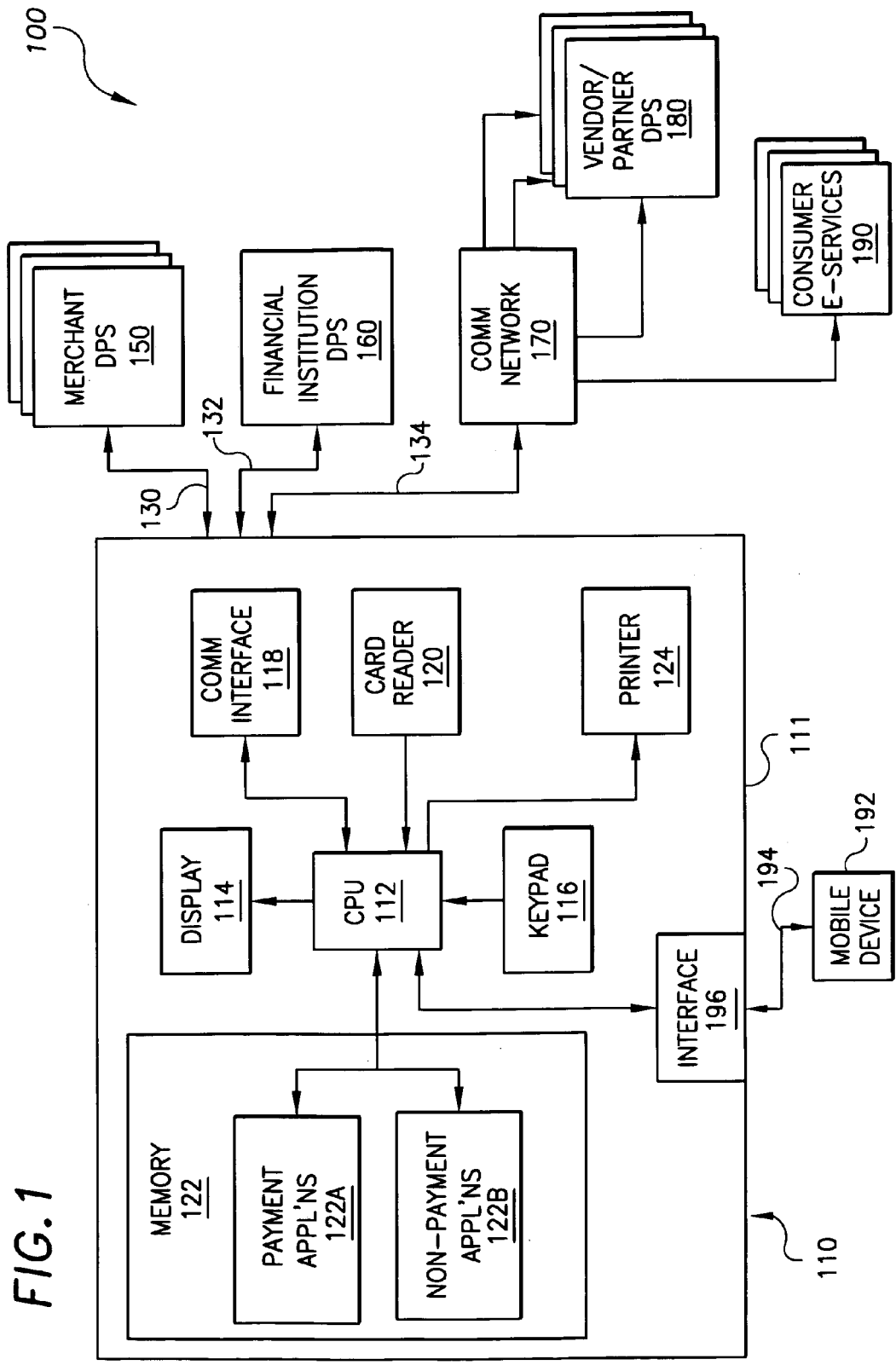
FIG. 1 illustrates a block diagram of an EFTPOS system in accordance with an example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Various embodiments of the present invention are described in connection with electronic funds transaction point of sale (EFTPOS) payment systems that provide highly secure payment processing and also provide merchants with the capability of offering non-payment services to customers. In addition, the enhanced EFTPOS system of the present invention will facilitate bi-directional access and communication between external communications networks and individual EFTPOS terminals without compromising the security of the EFTPOS system. Those skilled in the art will appreciate that the invention could be implemented in a variety of programming languages and hardware platforms.

Referring now to the figures, FIG. 1 illustrates a block diagram of an EFTPOS system 100 in accordance with an example embodiment of the invention. EFTPOS system 100 includes an EFTPOS terminal 110 communicatively coupled via a communications link 130 to an external merchant DPS(s) 150. Terminal 110 is also coupled via a communications link 132 with a financial DPS 160 and coupled with a communication link 134 with a communications network 170. Communications links 130 and 134 include, but are not limited to, hardwired and wireless connections using traditional public service telephone networks, wireless WAN, cellular networks, satellite networks or the Internet or Intranet networks. Link 132 is hardwired to ensure a high level of security in communications with financial DPS 160; however wireless systems that demonstrate high levels of secure communications can be substituted. Terminal 110 is communicatively coupled via network 170 to a plurality of vendor DPSs 180 and to a plurality of consumer e-Services servers 190, either through a PSTN network or through the Internet (not shown). Consumer e-Services include those services available via the Internet or some other communications network that completes tasks, solves problems or conducts transactions on behalf of the consumer/purchaser of such services. E-Services are available to individuals and business entities and are usually accessed through an information appliance (e.g., PC, digital wireless communications device and PDAs). A sampling of e-Services include airline/hotel/car rental booking services, bill paying services, reservation services, employee portals for information on benefits and trading portals. In one example embodiment, terminal 110 is a conventional EFTPOS terminal modified, according to the present invention, to process and respond to data related to non-payment transactions as well as traditional payment transactions.

In this example embodiment, terminal 110 includes an enclosure 111, a central processing unit (CPU) 112, a display 114, a keypad 116, a communications interface 118, a card reader 120, a memory arrangement 122 and a printer 124. Card reader 120 is a magnetic stripe reader that is adapted to read data from the magnetic stripe located on most credit or charge cards. In another example embodiment, card reader 120 includes a slot for reading smart cards that have integrated chips located thereon. CPU 112 is coupled to memory 122 and is adapted to be programmed to securely process payments with financial DPS 160. Memory arrangement 122 includes a payment application 122A for processing payments with financial institutions and a non-payment application 122B for facilitating non-payment transactions, including the acquisition of products and services from vendors that are authorized to communicate with terminal 110. Terminal 110 is also adapted to handle various display options, process data oriented to internal merchant operations (e.g., track employee hours and employee productivity), and establish wireless communication via an interface 196 when mobility is important to conducting the merchant's business.

In an example embodiment, a customer's purchases are logged into the EFTPOS arrangement using keypad 116 (or a bar-code reader coupled to the EFTPOS arrangement—not shown). Once all the goods have been logged into the system, the customer proceeds to pay with a store charge card or a bank-issued credit card. Once prompted by display 114, the clerk then proceeds to slide the card (or otherwise present data) for the card reader 120 in order to gather customer-specific account information. Once the payment authorization process is complete, the customer has the option of conducting additional transactions on terminal 110 that are not directly related to the merchant's business. For example, the customer has the option of using the features of non-payment application 122B to access and pay utility bills through terminal 110. In another example, the customer can purchase event tickets or a fishing license through terminal 110 before leaving the store. In yet another example, the customer uses terminal 110 to transact in "stored-value" quantities. Stored-value data are unit quantities that are redeemable for value such as calling minutes for a calling card, minutes for a parking card or cash value for a store debit card.

With the terminal (or EFTPOS arrangement) of the present invention, the merchant can set up partner relationships with other vendors to provide products/services directly to the merchant's customers at the merchant's location(s). Vendor applications can be added to non-payment applications 122B to offer new products or services to the merchant's customers. In one example embodiment, keys on the keypad are dedicated to a vendor. Alternatively, a vendor code input in the EFTPOS terminal starts a certain vendor application. Once connected to the proper database (either at the merchant location or remote to the vendor's server), the customer makes his product/service selections via the EFTPOS terminal. The customer can either complete the transaction immediately or reserve the transaction for later completion. In offering these services, the merchant derives a benefit by: increased traffic to his retail location, receiving a commission from the vendor for each sale consummated at the merchant's location, charging a mark-up on the product/service sold, or charging the vendor a monthly fee for providing the vendor application on the merchant EFTPOS system. The system is flexible in that vendors can easily be listed or de-listed by adding or removing vendor applications (e.g., non-payment applications 122B) from EFTPOS arrangement (terminal) 110 and system 100.

In addition, customers can use system 100 to access consumer E-Services 190 via terminal 110 with little or no Internet service costs since they are using the merchant's Internet connection. Internet and Intranet content and services are available to customers at the merchant's checkout counter, or at a kiosk or vending machine at the merchant's location. The customer can now go shopping and take care of bill paying all at one time.

In another embodiment, system 100 facilitates wireless interaction between a mobile communications device 192 and terminal 110, thereby providing mobility with connectivity to the EFTPOS system. Mobile device 192 includes, but is not limited to, a PDA personal digital assistant), a digital wireless telephone, and a smartphone that communicates via a communications link 194 to interface 196 located on the terminal 110. Mobile device 192 communicates with terminal 110 via any implementation dependent wireless communication technology, for example, infrared, Bluetooth™ or cellular-based communications. An advantage to offering communication capabilities with terminal 110 via infrared or Bluetooth™ is that the connectivity to external communication networks (such as the Internet) via system 100 can be accomplished with no cost to the mobile device user. In one example, a hotel using system 100 can lend PDAs to their guests (or they can use their own) to facilitate in-house access to hotel services or to shop on the Internet without having to have a PC or having to register with an ISP (Internet Service Provider). A guest can log into the hotel's communication network via a plurality of terminals 110 (or communication repeaters located throughout the facility) and can access their bills or review the schedule of events for that day. A guest can also connect to consumer e-Services 190 through system 100 in order to obtain a digital receipt for a purchase or to make a bill payment. Interface 196 (or repeaters) includes, for example, bi-directional transmission capabilities (such as a transceiver) for processing communications between mobile device 192 and terminal 110.

Referring now to FIG. 2, flowchart 200 illustrates an example embodiment of a computer implemented method of offering products and services via EFTPOS terminal arrangement 110 located at a merchant location. At step 202 Internet or Intranet content is provided to the customer in the form of data sets received over a communications network and presented on display 114 of terminal 110. The customer can choose to continue with the currently displayed content (special offer, coupons, etc.) or access another product or service. To purchase an offered product, for example, an event ticket, at step 204 the customer accesses one of several vendor DPSs 180 or merchant DPS 150 (if the merchant is authorized to resell the product) via one of non-payment applications 122B of terminal 110. For ease of access to the vendor DPS, keypad 116 includes in one embodiment a key labeled specifically for the vendor of interest. Alternatively, the vendor's code is entered with the keypad and then forwarded by EFTPOS arrangement 110. Non-payment applications 122B are configured to communicate with various vendors DPSs 180 through communications network 170. Network 170 includes, but is not limited to, a public service telephone network, the Internet, a cable network or a wireless network. Once the vendor is accessed, at step 206 the customer selects from a vendor database a product or service using display 114 and keypad 116. System 100 provides real-time, two-way communication between the vendor and the customer via the display and keypad of the merchant's EFTPOS terminal arrangement 110.

At step 208, the merchant, or alternatively the vendor depending on the merchantvendor agreement, then determines a payment amount. This step is optional since the customer may choose not to pay at this time and may choose to only make a confirmed reservation where the "product" is not actually purchased. Thus, "product" as used herein refers to tangible products, services and also to reservations for services or products (e.g., a restaurant reservation). The customer is given a confirmation code referencing the reservation. Where the payment is made electronically, at step 210 the EFTPOS arrangement initiates payment to the vendor via payment application 122A that is configured to communicate with financial DPS 160 residing at a financial institution. The data set describing the transaction is then transferred from non-payment application 122B to payment application 122A. In this example, the data set includes the item selected (or its cost) and the customer's account number (customer-specific financial account data). The data set are then transmitted to financial DPS 160 for processing of payment in a manner similar to conventional EFTPOS transactions. At step 212, either the merchant or the customer receives a transaction confirmation (such as a payment status or confirmation code) via display 114 in response to the data set transmission. Once the transaction is complete, printer 124 prints out the customer's receipt and, depending on the application used, prints out the game ticket or a reasonable facsimile thereof. The non-payment applications can be programmed using a languages such as WML, XML, and HTML.

In an example non-payment application, the details of the above transaction are used to award the customer loyalty points under a loyalty award program. Since the purchase quantity needs to be credited to the customer's loyalty program account, the transaction data is sent from EFTPOS arrangement 110 to one of vendor DPSs 180. Referring to FIG. 2, at step 214, a transaction data set is generated in response to the product/service selection. At step 216, the data set is then transmitted from terminal 110 to the appropriate vendor DPS via communications network 170 after payment has been confirmed. The data set is then stored in association with the customer's loyalty program account number and tracked in the vendor's database.

In another example embodiment of the loyalty program, the vendor-sponsored loyalty program is configured to manage a plurality of member identification codes. The method includes generating at least one data set in connection with a transaction (such as a purchase) between a member and the merchant (e.g., frequent flyer miles based on a hotel stay). A first vendor DPS (e.g., Northwest Airlines) is then accessed via the EFTPOS terminal arrangement, the EFTPOS arrangement including a first vendor application configured to communicate with the first vendor DPS. The data set is then transmitted via the EFTPOS arrangement and stored in a vendor database associated with a member identification code. A transaction confirmation is then received by the member via the EFTPOS arrangement in response to the data set transmission.

In another example non-payment application, EFTPOS arrangement 110 supplies stored-value to cards under various programs sponsored by a vendor. Stored-value includes quantifiable units that can be purchased and stored in a storage device such as a card or a digital device. Examples of stored-value are calling minutes that are stored on a calling card, toll tag fees that are rechargeable on the windshield device, cash value on a store debit card, parking minutes stored on a magnetic card. For instance, the EFTPOS terminal of arrangement 110 adds minutes to a calling card, adds cash value to a store debit card, or adds parking time to a parking card. Similar to the previous non-payment application, EFTPOS arrangement accesses the calling card vendor DPS or another DPS that gives the merchant authorization to engage in calling card minutes (stored value data). A stored value data set (for example, number of calling minutes) is generated in response to a data selection made by the customer from the vendor's database. The stored value data set (number of minutes) is then transmitted from the calling card vendor's DPS via the EFTPOS terminal arrangement and is stored on the customer's calling card (or other suitable similar storage device) via a card interface coupled with the EFTPOS terminal arrangement (not shown). Other storage devices include, but are not limited to, a PDA, a notebook PC or a mobile telephone.

Figure 3:
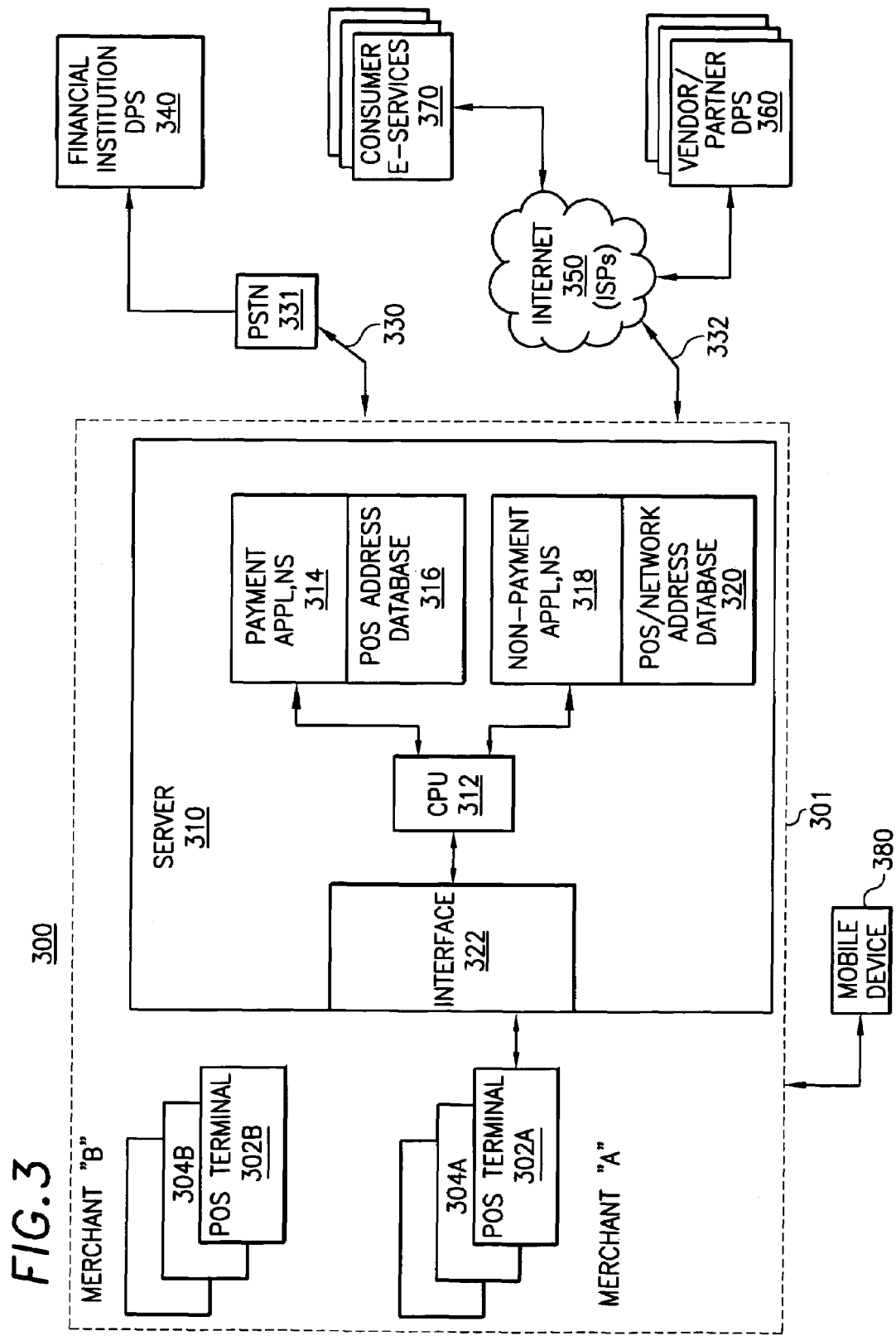
FIG. 3 is a block diagram of an EFTPOS system in accordance with another example embodiment of the invention.

Referring now to FIG. 3, a block diagram illustrates an example embodiment of an EFTPOS transaction system 300 that provides communication flexibility without compromising security for payment transactions. System 300 includes a server 310 that has a CPU 312 coupled to a financial DPS 340 located at a financial institution. Server 310 communicates with financial DPS 340 via a modem bank (not shown) and a communications line 330 of a PSTN network 331 that is highly secure to avoid the corruption of highly sensitive financial data during payment processing. In processing a payment, only server 310 has the EFTPOS address of each of the EFTPOS terminals that are coupled to the server and access to the terminal can only be approved by server 310. In order to ensure the high level of security required by financial institutions, the EFTPOS addresses are kept in confidence and are not available to non-approved third parties. Incoming data from financial DPS 340 is transmitted through a payment application 314. Payment application 314 has access to EFTPOS address database 316 that includes the EFTPOS addresses of all of the EFTPOS terminals coupled to server 310. CPU 312 directs the incoming financial data to the correct EFTPOS terminal through an interface 322.

System 300 provides the capability of real-time, two-way communication between an external DPS (one that is not part of the payment processing system) and one or more of the individual EFTPOS terminals of a merchant via a proxy server 310. Server 310 is communicatively coupled to a plurality of vendor DPSs 360 and to a plurality of servers providing consumer e-Services 370. Server 310 receives from one of the vendor DPSs 360 a first data set with a network address identifier that identifies an EFTPOS terminal that is going to receive the data set. The data set includes, but is not limited to, Internet/Intranet content, a vendor message or promotion or vendor advertising. The first data set is directed to an EFTPOS terminal 302A that is coupled to server 310. The EFTPOS terminal 302A is identified from the network address identifier given to one of the vendor DPSs 360 for that particular terminal. The network address identifier is similar to a URL address but is not the same as the EFTPOS address of EFTPOS terminal 302A. In order for the data set to reach terminal 302A, server 310 converts the address identifier to the EFTPOS address assigned to terminal 302A and then transmits the first data set to the EFTPOS terminal originally intended by vendor DPS 360 now using the EFTPOS address.

In another example embodiment, system 300 includes an EFTPOS arrangement 301 that is coupled to financial DPS 340 and coupled to the Internet 350. Arrangement 301 is also coupled to vendor-managed DPSs 360 and to consumer e-Services servers 190 via a communications link 332 and Internet 350. Arrangement 301 includes a plurality of merchant EFTPOS terminals 302A-304A (corresponding to merchant A) and EFTPOS terminals 302B-304B (corresponding to merchant B) adapted to process the data sets received from various vendor-managed DPSs 360. Arrangement 301 further includes server 310 that is configured to direct data sets received (via the communications network) from vendor DPSs 360 to one of the merchant EFTPOS terminals using a URL address identifier that is sent with the data set. Vendor-managed DPSs 360 are configured to send a plurality of data sets, such as messaging or advertising content, to various merchants or merchant EFTPOS terminals. The data sets may also include information provided in response to customer solicitations at one of the EFTPOS terminals. In another example, the data sets include banner ads or special offers being made available by the vendor to the merchant or his customer at the EFTPOS terminal via the display.

Server 310 is configured and arranged to assign a different URL address identifier to each of the respective EFTPOS addresses of the plurality of EFTPOS terminals. Internet or vendor promotional content (or data sets) sent from one of DPSs 360 are sent with a URL address identifier through the communications network. Non-payment application 318 of server 310 is configured to convert the URL address identifier received with the data set into one of the assigned EFTPOS addresses via EFTPOS/Network address database 320. Upon address conversion, CPU 312 sends the data set with the assigned EFTPOS address to communications interface 322. Interface 322 then relays the data set to the correct EFTPOS terminal using the EFTPOS address, such as EFTPOS terminal 302A. Interface 322 includes two-way transmission capabilities for communicating with the EFTPOS terminals via a hardwire or a wireless communications medium. In one example, address database 320 includes lookup tables that associate EFTPOS addresses with network addresses (e.g., URL) given to each qualified vendor by server 310. If it is no longer desirable for a specific vendor to have access to EFTPOS arrangement 301 or to a merchant's EFTPOS terminals, server 310 simply invalidates the list of addresses within database 320 originally given to the formerly qualified vendor. Security is also tightened in system 300 since payment communications are kept separate by CPU 312 from non-payment communications and CPU 312 prevents unauthorized applications from operating within the system 300.

Non-payment transactions that are started with a vendor through the "non-payment" channel that turn into purchases of products or services (or are payment-related activities) and are consummated on the payment side of server 310. The details of the non-payment transaction are transferred to payment applications 314 for traditional payment processing through financial DPS 340. Server 310 can be configured to respond to various Internet commands, such as HTTP, HTTPS, TCP/IP, XML, E-Speak and URL. Communications capabilities with the server would include GSM, wireless, modem, cable, DSL, private networks, TDMA, MOBI-FAX, WAP, etc.

In a related embodiment, wireless access by a mobile device 380 to server 310 is also enabled through interface 322. In one example, interface 322 includes WAP (Wireless Application Protocol) capabilities that enable it interact with Bluetooth™-enabled mobile devices or with a wireless wallet having a smart card/credit card therein. This feature allows the customer to pay for his purchases without removing the wallet from his pocket. The Bluetooth protocol uses wireless data and voice transmission that uses radio technology to communicate with a smart card reader in the wallet. When a smart card is inserted into the wallet or mobile device 380, it can communicate with the Bluetooth-enabled EFTPOS terminal or EFTPOS arrangement 301. In this example embodiment, the WAP enabled EFTPOS arrangement 301 gathers the transaction data and the smart card data from the wireless wallet via RF communications and processes the data through server 310. Once payment processing is complete, the EFTPOS terminal (e.g., EFTPOS terminal 302A) at the customer location receives confirmation of the transaction and a receipt can be printed out.

In addition, system 300 facilitates access by users of the system to consumer e-Services 370 via the EFTPOS terminals and server 310 similar to the embodiments described in connection with FIGS. 1 and 2.

One of the advantages to server 310 is the ability to retrofit older EFTPOS systems with server 310 to automatically upgrade the entire system. Server 310 provides older systems with the capabilities of conducting financial and non-financial transactions using the current communications lines that the EFTPOS terminals are connected to. New applications, financial or otherwise, are added to server 310 without having to make hardware adjustments/changes at the EFTPOS terminal sites. EFTPOS systems are easily upgradable without full-scale investments in new systems and hardware. Security at server 310 can be increased with the inclusion of additional firewalls and backup mirroring servers to avoid total system downtimes.

Referring now to FIG. 4, a flowchart 400 illustrates a computer implemented method of transmitting non-financial data to an EFTPOS terminal of an EFTPOS system in accordance with an example embodiment of the invention. At step 402, a database of EFTPOS addresses 316 is used to assign an EFTPOS address to the at least one EFTPOS terminal (e.g., terminal 302A). At step 404, a first data set that includes a network address identifier, such as a vendor server promoting a new product or service, is received from an external DPS. The first data set is directed by the external DPS to a particular EFTPOS terminal using the address identifier since the external DPS does not have the actual EFTPOS address for direct communication. The EFTPOS address is kept in confidence from the external DPS in order to maintain secure communications between the terminal and the financial DPS for payment processing and funds transfer. In an optional step, the address identifier is additionally encoded to include a DPS address identifier for the external DPS for routing return responses at a later time. At step 408, in response to receiving the first data set from the external DPS, the address identifier is converted by database 320 to the EFTPOS address assigned to the EFTPOS terminal using EFTPOS addresses database 316. At step 410, the first data set is transmitted to the particular EFTPOS terminal using the EFTPOS address and the data set is then displayed on the terminal display.

Where a reply is solicited from the external DPS, at step 412, the originally targeted EFTPOS terminal transmits back a second data set (e.g., product/service selection) in response to receipt of the first data set. At step 414, the EFTPOS address of the targeted terminal is then converted using database 320 at server 310 to the external DPS address identifier. Non-payment application 318 maintains two-way communication between the external DPS and the terminal until a transaction confirmation occurs or a payment is completed. Where a payment transaction is initiated, the details of the purchase are transferred to payment application 314 and are then processed on the payment side of server 310 in the traditional fashion with financial DPS 340. CPU 312 functions as the "gatekeeper" between applications 314 and 318 to ensure that security is not breached.

Figure 5:
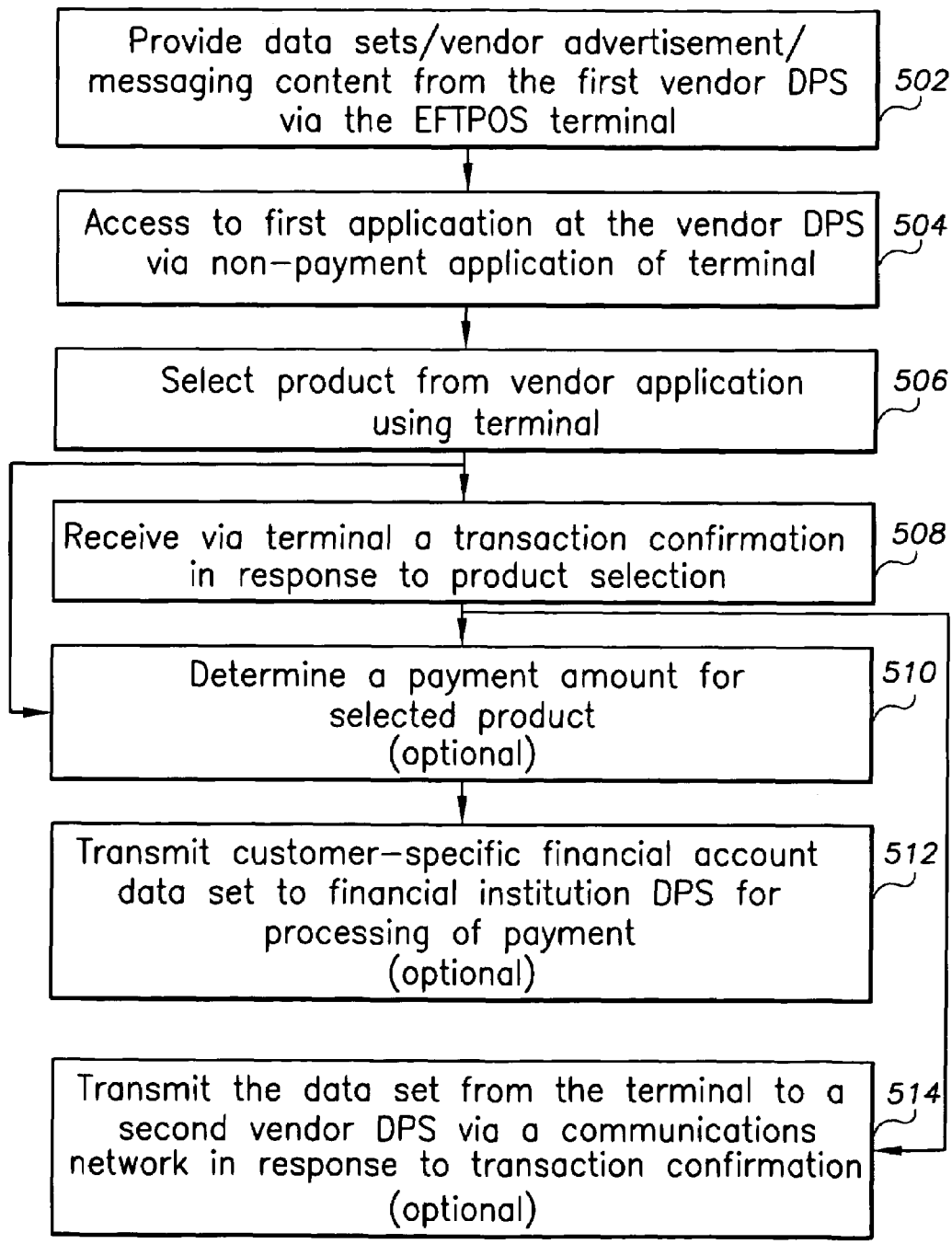
FIG. 5 is a flowchart illustrating the manner of providing products and services via an EFTPOS system in accordance with another example embodiment of the invention.

Referring now to FIG. 5, a flowchart 500 illustrates a computer implemented method of providing products and services via an EFTPOS system in accordance with another example embodiment of the invention. The methods described herein can be implemented via systems 100 and system 300, but are not limited to such architecture. At step 502, a data set, that includes vendor advertising, messaging content or Internet content, is displayed from content provided from a non-financial communications network to the EFTPOS arrangement. The data set may include a continuous information stream displayed at the EFTPOS terminal and is not limited to one data set transmission. Step 502 is optional where the vendor is known and the vendor DPS is accessed directly irrespective of content displayed. At step 504, a vendor DPS (which can include the merchant's own DPS as well as another vendor's DPS) is accessed via non-payment application of the EFTPOS terminal. At step 506, a product is selected from a product/service database of the vendor DPS using the terminal to communicate the selection. At step 508, a transaction confirmation is received via the EFTPOS terminal in response to the product/service selection. This provides the convenience of making the product selection or restaurant reservation without having to pay for it immediately. The confirmation can be presented in the form of a digital or printed receipt or just a confirmation number or a displayed message. Where the selection is being paid for immediately (or being prepaid prior to actual pick-up), at step 512 a set of customer-specific financial account data (e.g., credit card number) is transmitted to a financial institution DPS for payment processing of the selection or reservation. Payment is initiated by sliding the credit card, store charge card or debit card through the card reader and then awaiting the transaction confirmation as described above.

In a related embodiment, loyalty program awards or points (e.g., frequent flyer miles, frequent purchase discounts, etc.) are accredited to a customer's account by forwarding the purchase data to a loyalty program DPS. At step 514, after payment has been confirmed the transaction information (data set) is transmitted from the terminal to the loyalty/vendor program DPS via a communications network (e.g., PSTN or the Internet). In an optional step, the method can include the step of validating the product selection and validating a payment with the vendor DPS before the product is tendered.

Figure 6:
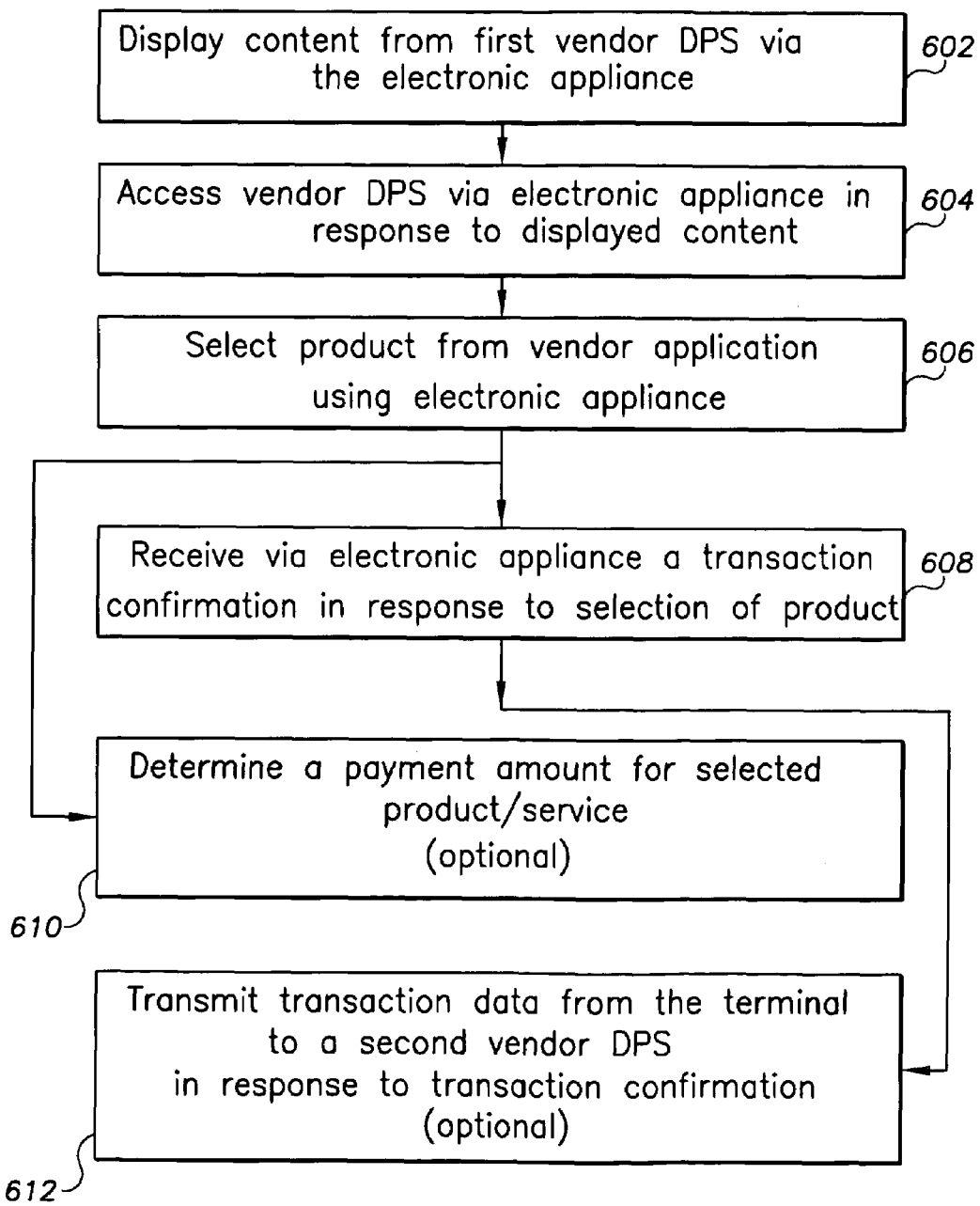
FIG. 6 is a flowchart illustrating the manner of providing products and services via an electronic appliance located at a point of sale in accordance with example embodiment of the invention.

Referring now to FIG. 6, a flowchart 600 illustrates a computer implemented method of providing products and services via an electronic appliance located at a point of sale in accordance with example embodiment of the invention. At step 602, a plurality of data sets from a communications network are displayed on the electronic appliance (e.g., a cash register with a viewable screen or a kiosk with a viewable screen and touchscreen capabilities). The data sets include static or continuous content provided by the local merchant or remote vendors via the Internet, Intranet or other communications networks. At step 604, a vendor DPS is accessed via the electronic appliance in connection with the displayed content. At step 606, a product or service (or a reservation is made) selection is made from a vendor database via the electronic appliance (e.g., touchscreen, keypad input, mouse click, etc.). At step 608, a transaction confirmation is received via the electronic appliance in response to the selection made at step 606. An optional step at step 610 is to determine a payment amount for the selected product/service based on an agreement between the merchant and vendor. At step 612, the transaction data can be forwarded for payment processing from the EFTPOS terminal to a financial DPS or alternatively can be transmitted from the terminal to a remote vendor DPS via a communications network for data gathering purposes or data storage.

With the aforementioned capabilities, merchants can provide their customers online products and services through their vendor/partners without the added investment in cost and space of having a personal computer next to their EFTPOS terminal. Vendor-Partners would include Internet Service Providers (such as Yahoo or AOL), Banks, Utilities, Hotels, Car rental companies, restaurants, etc. Vendor-Partners would have access to server 310 to promote their products and services without compromising the security at the EFTPOS terminals or payment processing side of the EFTPOS terminal arrangement. Partners can also actively advise merchants of new offerings via instant messaging or electronic mail that are sent to an individual EFTPOS terminal or a set of EFTPOS terminals or devices. Inventory inquiries, loyalty programs, stored value purchases and market data gathering related activities would also be facilitated with the EFTPOS terminal arrangement of the present invention.

Various embodiments of the invention are believed to be applicable to a variety of EFTPOS payment authorization systems. The present invention has been found to be particularly applicable and beneficial in scenarios involving EFTPOS transactions that are conducted in the customer's presence. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer implemented method of processing product purchase information in an electronic funds transaction point of sale (EFTPOS) terminal arrangement, the method comprising:

associating by a server, a respective externally-visible address with a respective EFTPOS address of each of a plurality of EFTPOS terminals;

receiving by the server from a first data processing system (DPS) a first data set that includes an externally-visible address and advertising information;

determining an EFTPOS address from the externally-visible address in the first data set in response to receiving the first data set from the first DPS by the server;

transmitting the first data set from the server to the EFTPOS terminal using the EFTPOS address;

displaying the advertising information on the EFTPOS terminal arrangement;

accessing a first application at the first DPS by a first one of the plurality of EFTPOS terminals via a non-payment application executing on the server;

selecting a product via the non-payment application offered by the first application on the first DPS;

determining an externally-visible address of the first EFTPOS terminal from the associated EFTPOS address of the first EFTPOS terminal in response to selection of the product;

transmitting a set of customer-specific financial account data and the externally-visible address of the first EFTPOS terminal from a payment application executing on the server to a second application executing on a financial institution DPS for processing payment for the product;

receiving at the server a transaction confirmation status and externally-visible address of the first EFTPOS terminal from the second application on the financial institution DPS;

determining an EFTPOS address from the externally-visible address received with the transaction confirmation status; and transmitting the transaction confirmation status from the server to the first EFTPOS terminal using the EFTPOS address.

2. The method according to claim 1, further comprising the step of establishing a wireless communications link via a mobile communications device with the server before the step of accessing the first DPS, wherein the product is selected from the first DPS via the mobile communications device.

3. The method according to claim 1, further comprising the steps of:
receiving at the server from the first application on the first DPS a selection confirmation code and accompanying externally-visible address generated by the first application on the first DPS for the selected product;
determining an EFTPOS address from the externally-visible address received with the selection confirmation code;
transmitting the selection confirmation code from the server to the first EFTPOS terminal using the EFTPOS address; and
transferring a data set from the non-payment application to a payment application executing on the server, the data set identifying the product.

4. The method of claim 1, further comprising the steps of:
generating at the server a data set identifying a payment amount for the product in response to the product selected; and
transmitting the data set from the server to a second DPS in response to receiving the transaction confirmation, wherein the data set is stored in the second DPS associated with a customer identification code.

5. The method according to claim 1, further comprising the step of determining a payment amount for the product after the selecting step.

6. A system for processing product purchase information in an electronic funds transaction point of sale (EFTPOS) arrangement, comprising:
means for storing associations of respective externally-visible addresses with EFTPOS addresses of a plurality of EFTPOS terminals;
a server coupled to the storage means and adapted to receive from a first vendor data processing system (DPS) a first data set that includes an externally-visible address and advertising information, determine an EFTPOS address from the externally-visible address in the first data set in response to receiving the first data set from the first vendor DPS, and transmit the first data set from the server to the EFTPOS terminal using the EFTPOS address;
a plurality of EFTPOS terminals coupled to the server, each EFTPOS terminal configured to display advertising information received from the server, provide access to a first application at the first vendor DPS via a non-payment application executing on the server, and responsive to user input select a product offered by a first application executing on the first vendor DPS via a non-payment application executing on the server;
wherein the server is adapted to determine an externally-visible address of a first EFTPOS terminal from the associated EFTPOS address of the first EFTPOS terminal in response to selection of a product at the first EFTPOS terminal, and transmit a set of customer-specific financial account data and the externally-visible address of the first EFTPOS terminal from a payment application executing on the server to a second application executing on a financial institution DPS for processing payment for the product; and
wherein the server is further adapted to receive a transaction confirmation status and externally-visible address of the first EFTPOS terminal from the second application on the financial institution DPS, determine an EFTPOS address from the externally-visible address received with the transaction confirmation status, and transmit the transaction confirmation status from the server to the first EFTPOS terminal using the EFTPOS address.

7. A method for processing product purchase information in an electronic funds transaction point of sale (EFTPOS) terminal arrangement, comprising:
establishing a first connection between a server and a first DPS via the internet, and establishing a second connection between the server and a second DPS via a telephone network;
accessing a first application at the first DPS by a first one of the plurality of EFTPOS terminals via a non-payment application executing on the server;
transmitting product information from the first DPS to the non-payment application on the server via the Internet in response to a first selection of a product at a first of a plurality of EFTPOS terminals;
transmitting the product information from the non-payment application on the server to the first EFTPOS terminal;
displaying the product information on the first EFTPOS terminal;
transmitting from the a payment application executing on the server to a second application executing on the second DPS purchase data including account information and indicating an amount of money in response to the first EFTPOS terminal;
processing payment for the product by the second application at the second DPS using the purchase data;
transmitting a purchase confirmation from the second application on the second DPS to the payment application on the server and from the payment application on the server to the first EFTPOS terminal; and
transmitting from the server to the first DPS via the internet, data that indicate purchase of the product in response to receipt of the purchase confirmation.

8. The method of claim 7, further comprising:
associating by the server, a respective externally-visible address with a respective EFTPOS address of each of the plurality of EFTPOS terminals; and
translating between the EFTPOS address of an EFTPOS terminal and the associated externally-visible address in transmitting data between the EFTPOS terminal and the first and second DPSs.

9. The method of claim 8, further comprising:
transmitting, in response to user selection of a key on the first EFTPOS terminal, a request for merchant information from the EFTPOS terminal to the server, wherein the key is dedicated to initiating the transmitting of the request for merchant information from a particular merchant;
transmitting the request for merchant information from the server to a merchant DPS via the internet;
transmitting the merchant information from the merchant OPS to the server via the internet;
transmitting the merchant information from the server to the first EFTPOS terminal; and
displaying the merchant information on the EFTPOS terminal.

10. The method of claim 7, further comprising:
transmitting, in response to user selection of a key on the first EFTPOS terminal, a request for merchant information from the EFTPOS terminal to the server, wherein the key is dedicated to initiating the transmitting of the request for merchant information from a particular merchant;

transmitting the request for merchant information from the server to a merchant DPS via the internet;

transmitting the merchant information from the merchant DPS to the server via the internet;

transmitting the merchant information from the server to the first EFTPOS terminal; and displaying the merchant information on the EFTPOS terminal.

11. The method of claim 7, further comprising:

detecting user selection of a first key of a plurality of merchant keys on the first EFTPOS terminal, wherein each of the other merchant keys is dedicated to initiating a request for merchant information from a respective one of a plurality of merchants transmitting, in response to user selection of the first key on the first EFTPOS terminal, a request for merchant information of a first merchant from the EFTPOS terminal to the server;

transmitting via the internet the request for merchant information from the server to a merchant DPS that is configured for the first merchant;

transmitting the merchant information of the first merchant from the merchant DPS to the server via the internet;

transmitting the merchant information from the server to the first EFTPOS terminal; and displaying the merchant information on the EFTPOS terminal.

12. A method for processing product purchase information in an electronic funds transaction point of sale (EFTPOS) terminal arrangement, comprising:

establishing a first connection between a server and a merchant DPS via the internet, and establishing a second connection between the server and a second DPS via a telephone network;

detecting user selection of a first key of a plurality of merchant keys on the first EFTPOS terminal, wherein each of the other merchant keys is dedicated to initiating a request for merchant information from a respective one of a plurality of merchants transmitting, in response to user selection of the first key on the first EFTPOS terminal, a request for merchant information of a first merchant from the EFTPOS terminal to a non-payment application executing on the server;

transmitting via the internet the request for merchant information from the non-payment application on the server to a merchant DPS that is configured to execute a first application for the first merchant;

transmitting the merchant information of the first merchant from the first application on the merchant DPS to the non-payment application on the server via the internet;

transmitting the merchant information from the non-payment application on the server to the first EFTPOS terminal;

displaying the merchant information on the EFTPOS terminal;

transmitting product information from the merchant DPS to the non-payment application on the server via the internet in response to a first selection of a product at the first EFTPOS terminal;

transmitting the product information from the non-payment application on the server to the first EFTPOS terminal;

displaying the product information on the first EFTPOS terminal;

transmitting, in response to selection of a product of the first merchant, payment information for the product from the EFTPOS terminal to a payment application executing on the server and from the payment application on the server to a second application executing on the second DPS via the telephone network; and processing the payment for the product at the second DPS.

* * * * *

UNITED STATES PATENT AND TRADEMARK OFFICE
CERTIFICATE OF CORRECTION

PATENT NO. : 7,295,992 B2 Page 1 of 1
APPLICATION NO. : 09/849925
DATED : November 13, 2007
INVENTOR(S) : Jean-Marc Villaret et al.

It is certified that error appears in the above-identified patent and that said Letters Patent is hereby corrected as shown below:

In column 14, line 59, in Claim 9, delete "OPS" and insert -- DPS --, therefor.

Signed and Sealed this

Twenty-ninth Day of July, 2008

JON W. DUDAS
*Director of the United States Patent and Trademark Office*